April 21, 1936. R. F. PEO 2,037,819
HYDRAULIC SHOCK ABSORBER
Filed Jan. 13, 1934 3 Sheets-Sheet 1
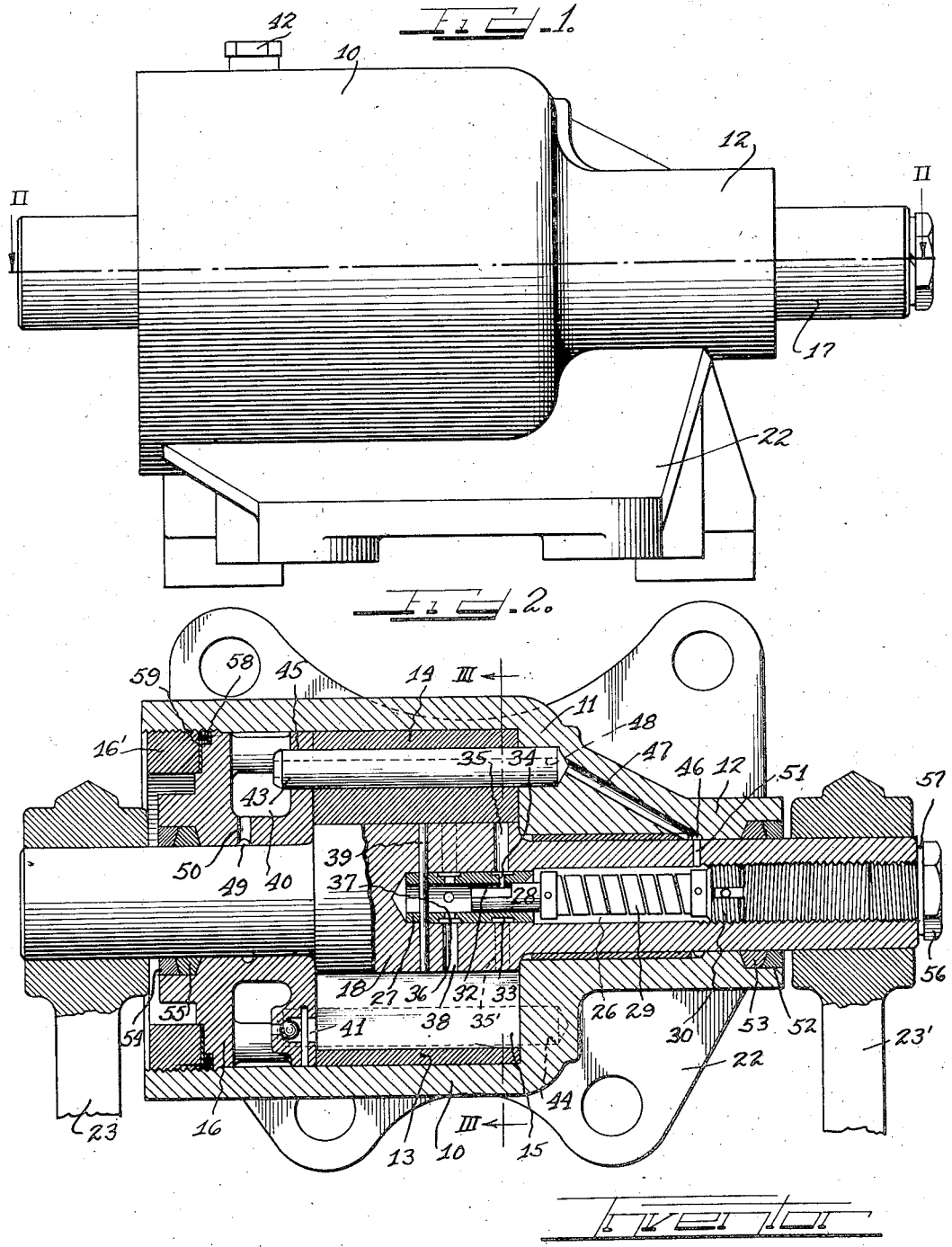
Inventor
Ralph F. Peo.
by Charles S. Hill Attys.

April 21, 1936.　　　　R. F. PEO　　　　2,037,819
HYDRAULIC SHOCK ABSORBER
Filed Jan. 13, 1934　　　3 Sheets-Sheet 2
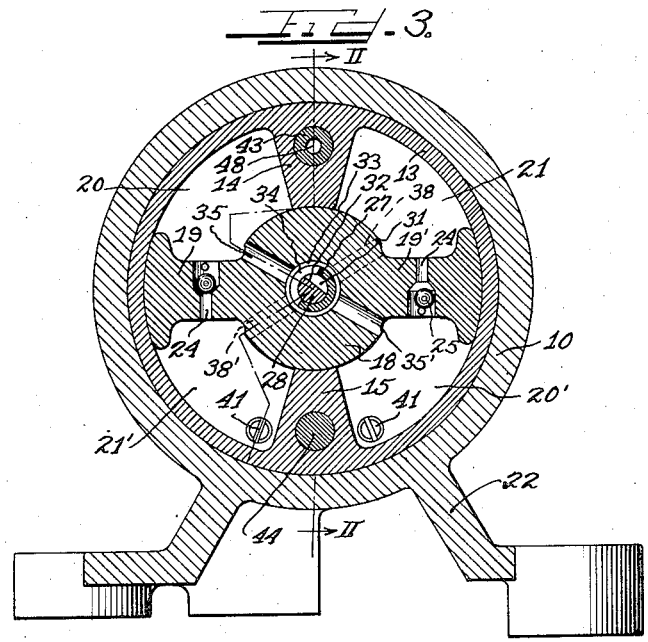
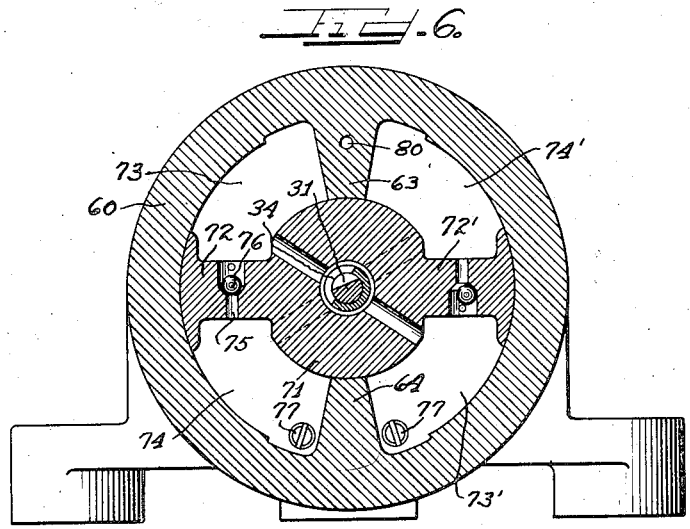
Inventor
Ralph F. Peo.

April 21, 1936.  R. F. PEO  2,037,819
HYDRAULIC SHOCK ABSORBER
Filed Jan. 13, 1934  3 Sheets-Sheet 3
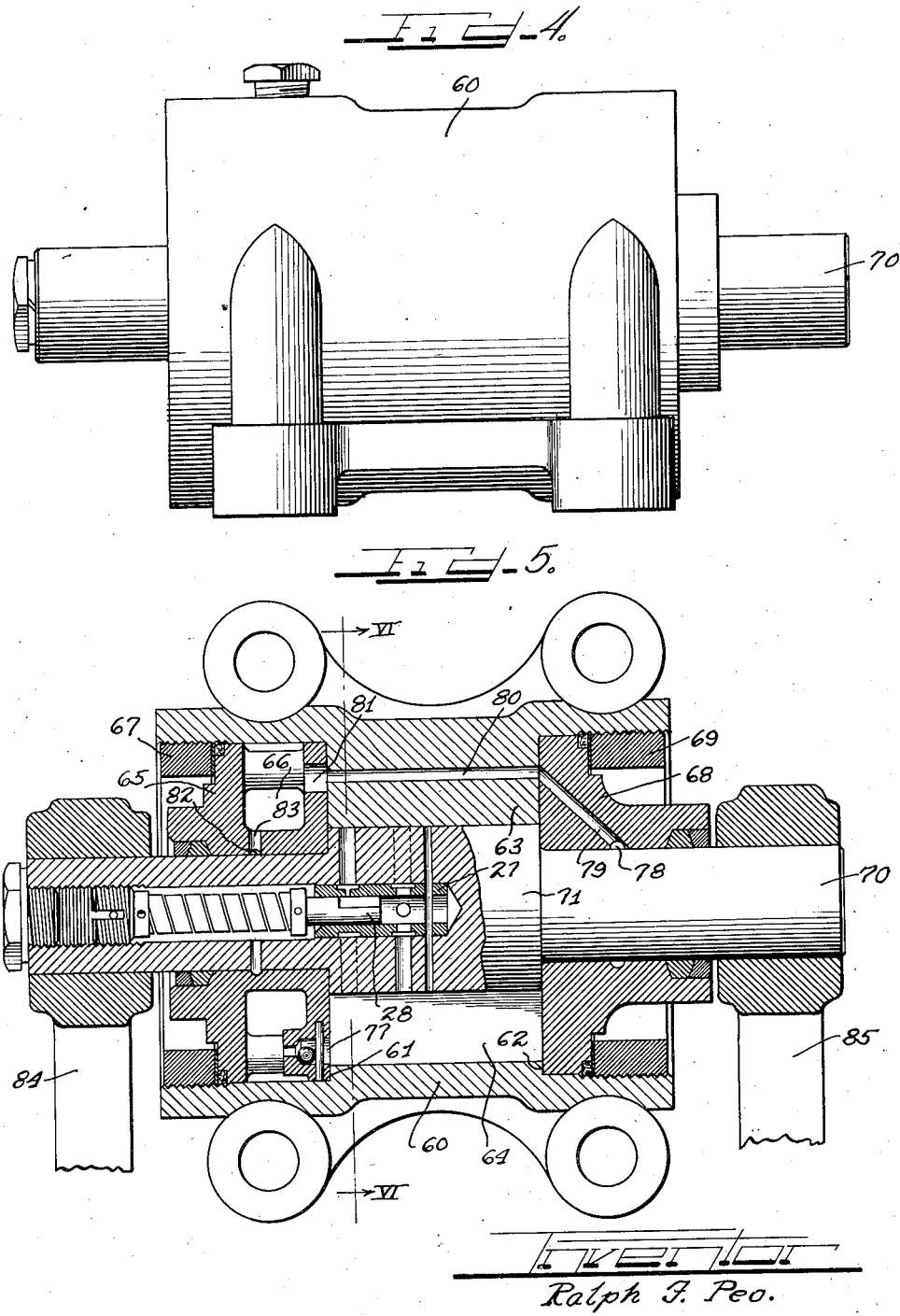
Inventor
Ralph F. Peo.
by Charles H. Wills Attys.

Patented Apr. 21, 1936

2,037,819

UNITED STATES PATENT OFFICE 2,037,819

HYDRAULIC SHOCK ABSORBER

Ralph F. Peo, Buffalo, N. Y., assignor to Houde Engineering Corporation, Buffalo, N. Y., a corporation of New York Application January 13, 1934, Serial No. 706,488

12 Claims. (Cl. 188—89)

This invention relates to hydraulic shock absorbers and particularly to shock absorbers of the rotary type, and in general the object is to provide construction and arrangement which will adapt the shock absorber structure for heavier and more severe duty as, for example, where the shock absorber is to be included in the linkage quadrangle of individual suspension for automobile wheels.

One of the important objects is to provide improved construction and arrangement which will make both ends of the shock absorber shaft available for connection with leverage structure or links and will balance the mechanical strains within the shock absorber.

Another important object is to provide improved structure and arrangement which will balance hydraulic strains within the shock absorber so that with the mechanical balance and the hydraulic balance the wear on the shock absorber shaft and its bearings will be reduced to a minimum.

Referring to the drawings disclosing structure in which the various features of my invention are incorporated, Figure 1 is a side elevation of a shock absorber;

Figure 2 is a general section on plane II—II, Fig. 1 but with the piston structure shown in section on plane II—II Figure 3;

Figure 3 is a section on plane III—III of Figure 2;

Figure 4 is a side elevation of a modified form of shock absorber;

Figure 5 is a section similar to Figure 2 but showing a modified arrangement;

Figure 6 is a section on plane VI—VI of Figure 5.

The shock absorber structure of Figures 1, 2 and 3 comprises a cup shaped cylindrical body or housing 10 having the end wall 11 integral therewith and which has the extension 12 forming a bearing. Seated in the frame 10 against the wall 11 is the ring 13 having the partition lugs 14 and 15 extending radially inwardly therefrom at opposite sides and forming the cylindrical wall of the hydraulic fluid space within the frame.

The outer wall structure 16 fits in the outer end of the frame 10 and abuts the ring 13 and the lugs 14 and 15 and defines the outer wall of the hydraulic fluid space. The wall structure 16 is securely held in position by the annular nut 16' threading into the end of the frame 10. The wall structure 16 has extending therethrough and journalled therein one end of a piston shaft 17, the other end of the shaft extending through and being journalled in the wall 11 and its extension 12. Between the walls 16 and 11 the shaft is of enlarged diameter to form a hub 18 from which extend the piston vanes 19 and 19' whose outer ends engage with the cylindrical wall of the ring 13, the piston hub engaging with the inner faces of the lugs 14 and 15. The piston structure and the lugs divide the space within the ring 13 into high pressure chambers 20 and 20' and low pressure chambers 21 and 21'.

The shock absorber body 10 has a suitable supporting base 22 by which it may be secured to a support such as the chassis frame of an automobile. A lever structure has its ends 23 and 23' secured to the outer ends of the piston shaft 17 and this lever structure may form part of the linkage quadrilateral in the individual suspension of an automobile wheel so that during travel of the automobile the shaft 17 and the piston structure thereon is oscillated for displacement of the hydraulic fluid in the working chamber for creation of hydraulic resistance to check and absorb the shocks of movement of the wheels.

Suitable means are provided for reducing the resistance to hydraulic fluid flow from the low pressure chambers to the high pressure chambers during the bump strokes of the piston, that is, when the chassis body and wheel move toward each other. As shown, each of the vanes 19 and 19' has a passageway 24 therethrough controlled by a check valve such as a ball 25, the arrangement being such that fluid may flow through the passageways from the low pressure to the high pressure chambers but not in reverse direction. Another path is provided for the flow of fluid between the high and low pressure chambers and this passage is controlled by adjustable valve mechanism, this passage taking some of the flow from the low pressure chambers to the high pressure chambers but being the sole means for flow from the high pressure to the low pressure chambers during rebound strokes of the piston, that is, when the chassis and wheel move away from each other.

On Figures 1, 2 and 3 I have shown a passageway automatically controlled by a thermostatically operated valve whose operation is substantially like that of the valve mechanism disclosed in Peo application Serial No. 645,725, filed Dec. 5, 1932. As shown in Figures 2 and 3, the shaft 17 has the axial bore 26 extending therein from one end thereof and terminating in the piston hub. Seated in the inner end of this bore is the tubular valve seat member 27 in the outer end of which the cylindrical valve plug or member 28 is seated for rotary movement, this valve being secured to the inner end of a helical thermostat element 29 which at its outer end is secured to a head 30 having threaded engagement in the bore 26 so that the valve 28 may be manually adjusted and set and will be automatically rotated by the response of the thermostat element to changes in temperature of the hydraulic fluid.

The valve 28 is milled away on one side to leave a valve passage 31 and a flat face or vane surface 32. The stationary seat member 27 has the annular exterior channel 33 and is slotted transversely to provide the narrow passage or orifice 34 extending circumferentially, being shown in Figure 3 as extending substantially 180°, this port or orifice being in alignment with the valve passage 31. The annular channel 33 is connected with the high pressure chambers 20 and 20' through ports or passages 35 and 35' extending radially through the hub 18 so that the hydraulic fluid forced from the high pressure chambers will flow through the orifice 34 into the valve passage 31 and impinge against the vane surface 32 to cause rotation of the valve 28 in a direction for decreasing overlap by the valve passage 31 of the port 34 and therefore increase of resistance to the fluid flow in accordance with the pressure of the fluid.

Inwardly of the channel 33, the seat member 27 has another circumferential channel 36 connected by one or more ports 37 with the interior of the seat member, the channel being connected with the low pressure chambers 21 and 21' respectively by ports or passages 38 and 38' extending through the piston hub, so that the fluid expelled from the high pressure chambers will flow from the valve passage 31 into the seat member 27 and from there to the ports 37, the channel 36 and the passages 38 and 38' to the low pressure chambers. During such flow, the check valves 25 in the piston vanes are held closed by the pressure so that all of the fluid from the high pressure chambers must flow through the restricted port or orifice 34. During reverse movement of the piston structure most of the fluid will flow through the passages 24 in the piston vanes and the remainder will flow through the orifice 34. The seat member 27 may be held against rotation by one or more pins 39 extending through the piston hub 18.

As before stated, the pressure of the fluid against the vane 32 of the valve during flow from the high pressure chambers to the low pressure chambers on the rebound strokes of the piston, will tend to move the valve toward closing position in accordance with the degree of pressure impact against the vane surface. The helical thermostat element 29, besides serving to automatically rotate the valve toward closing position as the viscosity of the fluid decreases with increase in temperature and toward opening position as the viscosity increases with decrease in temperature, serves also the purpose of a spring for resisting turning movement of the valve by the fluid pressure and to restore the valve as the pressure abates.

The wall structure 16 has the annular space 40 forming a fluid reservoir which keeps the working chambers replenished with fluid through check valve controlled passages 41 communicating with the lower working chambers 20 and 21', fluid flow from the chambers to the reservoir being checked. A filler opening is provided for the replenishing chamber or reservoir 40 which opening is closed by a plug 42 (Figure 1).

The partition lug supporting ring is held rigidly in position by dowel pins 43 and 44 extending respectively through the upper and lower partition lugs 14 and 15 and into the wall 11. These dowel pins may project a distance beyond the outer sides of the partition lugs to be received by openings 45 through the inner side of the wall structure 16 to serve to properly align the wall structure 16 in the housing 10.

Any fluid which may be forced out of the working chambers and between the shaft and the bearing surface therefor in the wall 11 and its extension 12 will be caught by the circumferential channel or groove 46 in the bearing extension 12, this groove communicating with the passage 47 through the wall 11 which passage is in registration with the bore or passageway 48 through the upper dowel pin 43, this bore at its outer end being in communication with the reservoir 40 so that the fluid collected in the groove 46 will be returned to the reservoir. Any fluid which is forced out between the shaft and its bearing surface in the wall structure 16 will be intercepted by the circumferential channel 49 in the wall structure and returned through a port 50 to the reservoir. Any fluid which escapes into the bore or valve chamber 26 in the shaft will escape through the hole or passage 51 extending through the shaft and communicating with the circumferential groove 46.

The bearing extension 12 on wall 11 has in its outer end a packing recess or pocket 52 for receiving packing material 53, and the wall structure 16 has at its outer end the packing recess 54 for suitable packing material 55. Any fluid which may get by the collector groove 46 or 49 will not be under pressure and will be prevented by the packing 53 and 55 from reaching the exterior of the shock absorber. The outer end of the shaft bore 26 is closed by a plug 56 with a gasket 57 interposed to prevent any fluid which may have escaped past the threaded head 30 of the thermostat structure from reaching the exterior of the shock absorber. Upon removal of this plug, the head 30 will be accessible for manual adjustment of the valve.

At its outer corner the wall structure 16 is recessed to receive a suitable gasket 58 which is held in place and compressed by a friction washer 59 against which the clamping annular nut 16' bears to secure the frame structure 16 in position. This gasket will prevent leakage from the reservoir 40 to the exterior of the shock absorber.

In the modified arrangement of Figures 4, 5 and 6, the shock absorber cylindrical body wall 60 is open at both ends and at its middle part is of reduced diameter to define the cylindrical wall of the hydraulic space and to provide annular shoulders 61 and 62. Upper and lower partition lugs 63 and 64 are formed integral with the wall 60 and extend radially inwardly between the shoulders 61 and 62. A wall structure 65, like the wall structure 16, in Figs. 1, 2 and 3, extends into and closes one end of the wall 60 and abuts against the shoulder 61 and provides the reservoir or replenishing chamber 66. This wall structure is securely held in place by the annular nut 67 threading into the end of the wall 60. At the other end the wall 68 fits in the end of the wall 60 and abuts the shoulder 62 and is held in place by the annular nut 69 threading into the end of the wall 60. The wall structures 65 and 68 journal the ends of the shaft 70 which between the wall structures has the cylindrical hub 71 from which extend the vanes 72 and 72', these vanes with the partition lugs defining the high pressure chambers 73 and 73' and the low pressure chambers 74 and 74'. Each of the vanes has a passage 75 therethrough controlled by a check valve 76 through which passages fluid may flow from the low pressure to the high pressure chambers but not in reverse direction. The valve structure and thermostat control for controlling the metering of the flow from the high pressure chambers to the low pressure chambers during rebound stroke of the piston is substantially the same as that disclosed in Figs. 1, 2 and 3 and is given the same reference characters.

The replenishing chamber 66 supplies fluid to the pressure chambers through the check valve controlled passages 77 in the same manner as in the arrangement of Figs. 1 to 3.

Any fluid which is forced out of the working chambers and between the shaft and the bearing wall 58 is intercepted by the annular groove 78 which communicates with a passage 79 through the wall 68 and registers with the end of the passage 80 through the upper partition lug 63, this passage in turn registering with the hole 81 through the inner side of the wall structure 65, so that the collected fluid is returned to the reservoir 66. Any fluid leaking out between the shaft and the wall structure 65 is intercepted by the circumferential groove 82 and returned by the port 83 to the replenishing chamber.

The ends of the piston shaft extend beyond the wall structures 65 and 68 so that lever arms 84 and 85 may be secured thereto and these lever arms may be formed as part of a unitary lever or link structure. The shock absorber structures disclosed and described are compact and durable and adapted particularly for use in individual wheel suspension. In such suspension system, the shock absorber body may be secured to the vehicle chassis and the lever or link structure secured to the shock absorber shaft may be one of the links of the linkage quadrilateral forming part of the suspension system. I have shown practical and efficient embodiments of the features of my invention but I do not desire to be limited to the exact construction, arrangement and operation shown and described as changes and modifications may be made without departing from the scope and spirit of the invention.

I claim as follows:

1. In a hydraulic shock absorber, the combination of a housing forming a cylindrical wall for the hydraulic fluid space, end walls for said housing forming the sides of said space, partition lugs extending from said housing into said space, a piston hub within said space concentric therewith and bearing against the inner faces of said lugs, shaft ends extending from said piston hub and journalled in said end walls and projecting beyond said walls for connection with lever structure, vanes on said piston hub for displacing the fluid between said partition lugs, means controlling the flow of fluid from one side of the vanes to the other during oscillation of said piston hub, one of said end walls having a space providing a fluid reservoir, means connecting said reservoir with the space in which said piston vanes operate, said reservoir end wall having a circumferential groove surrounding the shaft end journalled therein and means connecting said groove with said reservoir, the other end wall having a circumferential groove around the shaft end journalled therein, a passage through said end wall communicating with said groove, and means forming a duct through one of said partition lugs, said duct communicating at one end with said passage and at its other end with said reservoir.

2. In a hydraulic shock absorber, the combination of an annular wall structure, end wall structures defining with said annular wall structure a cylindrical space for hydraulic fluid, partition lugs extending from said annular wall structure into said space, a shaft extending through said space and end wall structures and journalled by said end wall structures, piston vanes extending from said shaft into said space and with said lugs dividing said space into high pressure and low pressure chambers, a passageway through said shaft connecting the high pressure chambers and a passageway through said shaft connecting the low pressure chambers, a valve interposed between said passageways for metering the flow of fluid between the high pressure and low pressure chambers, one of said end wall structures being hollow to provide a fluid replenishing chamber, and means controlling the flow of fluid from said replenishing chamber to said pressure chambers.

3. In a hydraulic shock absorber, the combination of an annular wall structure, end wall structures defining with said annular wall structure a cylindrical space for hydraulic fluid, a partition extending into said space from said annular wall structure and between said end wall structures, a fluid displacement piston structure operable within said space and dividing said space into working chambers at opposite sides of said partition, shaft ends extending from said piston structure and journalled in said end wall structures, valve means for metering the flow of fluid from one side of the piston structure to the other, one of said end wall structures providing a fluid replenishing chamber, means controlling the connection of said replenishing chamber with said working chambers, there being a passageway through said partition and through said replenishing chamber wall structure for communication with the replenishing chamber therein, a groove in said replenishing chamber wall structure surrounding the shaft end journalled therein and connected by a port directly with said replenishing chamber for returning escaped fluid to the replenishing chamber, and a groove in the other end wall structure surrounding the shaft end journalled therein and a passageway through said end wall structure connecting said groove with the end of the passageway through said partition whereby escaped fluid collected in said groove will be returned to the replenishing chamber.

4. In a hydraulic shock absorber, the combination of an annular wall structure, end wall structures defining with said annular wall structure a cylindrical space for hydraulic fluid, a partition extending into said space from said annular wall structure and between said end wall structures, a piston structure within said space for displacing the fluid therein and dividing said space into working chambers at opposite sides of said partition, shaft ends extending from said piston structure through and beyond said end wall structures and journalled in said end wall structures concentric with said cylindrical space, valve mechanism for metering the flow of fluid from one side of the piston structure to the other, one of said end wall structures providing a space forming a replenishing chamber and means for controlling the flow of fluid from said replenishing chamber to the working chambers, a circumferential groove between the replenishing chamber wall structure and the shaft end journalled therein, a circumferential groove between the other end wall structure and the shaft end journalled therein, said grooves intercepting any fluid which may be forced out of the working chambers and between the shaft ends and the end wall structures, and passageways connecting said grooves with said replenishing chamber for return of the collected fluid thereto.

5. In a hydraulic shock absorber, the combination of an annular wall structure, end wall structures defining with said annular wall structure a cylindrical space for hydraulic fluid, one of said end wall structures being a separate structure and fitting into the annular wall structure, means for securing said detachable wall structure in place, a partition extending from said annular wall structure into said cylindrical space between said end wall structures, a piston structure operable within said space and dividing said space into working chambers at opposite sides of said partition, shaft ends extending from said piston structure through and beyond said end wall structures and journalled in said end wall structures concentric with said cylindrical space, valve mechanism for metering the flow of fluid from one side of the piston structure to the other, said detachable wall structure having a space defining a fluid replenishing chamber, means controlling the flow of fluid from said replenishing chamber to said working chambers, a dowel pin extending through said partition and into said end wall structures and having a bore therethrough communicating with the replenishing chamber, a circumferential intercepting channel between said replenishing chamber wall structure and the shaft end journalled therein and a passage through said wall structure connecting said groove with the replenishing chamber for the return thereto of any fluid escaping from the working chambers, there being an intercepting groove between the other end wall structure and the shaft end journalled therein and a passage through said wall structure connecting said groove with the adjacent ends of the bore through said dowel pin for return of fluid collected in said groove to the replenishing chamber.

6. In a hydraulic shock absorber, the combination of an annular wall structure, detachable end wall structures fitting into the ends of said annular wall structure and defining therewith a cylindrical space for hydraulic fluid, means securing said end wall structures in said annular wall structure, a partition extending into said cylindrical space from said annular wall structure and between said end wall structures, a piston structure operable within said space to displace the fluid therein and dividing said space into working chambers at opposite sides of said partition, shaft ends extending from said piston structure and journalled in said end wall structures, valve means for metering the flow of fluid from one side of the piston structure to the other, one of said end wall structures being hollow to provide a replenishing chamber, means controlling the flow of fluid from said replenishing chamber to the working chambers, and means for returning to said replenishing chamber any fluid forced out of the working chambers between the shaft ends and said end wall structures.

7. In a hydraulic shock absorber, the combination of an annular wall structure, detachable end wall structures fitting into the ends of said annular wall structure and defining therewith a cylindrical space for hydraulic fluid, means securing said end wall structures in said annular wall structure, a partition extending into said cylindrical space from said annular wall structure and between said end wall structures, a piston structure operable within said space to displace the fluid therein and dividing said space into working chambers at opposite sides of said partition, shaft ends extending from said piston structure and journalled in said end wall structures, valve means for metering the flow of fluid from one side of the piston structure to the other, one of said end wall structures being hollow to provide a fluid replenishing chamber, means controlling the connection of said replenishing chamber with the working chambers, a circumferential groove between said replenishing chamber wall structure and the shaft end journalled therein for intercepting fluid escaping from the working chambers, a passage through said wall structure connecting said groove with said replenishing chamber, a circumferential groove between the other end wall structure and the shaft end journalled therein and a return passage from said groove to the replenishing chamber, said partition having a bore therethrough included in said return passageway.

8. In a hydraulic shock absorber, an annular wall and end walls defining a working chamber, a piston structure operable in said working chamber, a shaft for said piston structure extending through and having bearing in one of said end walls, means providing a fluid reservoir adjacent to said other end wall, and means independent of said piston structure for returning from said shaft bearing to said reservoir any fluid escaping from said working chamber to said bearing.

9. In a hydraulic shock absorber, the combination of an annular wall having an end wall integral therewith and provided with a bearing extension, a detachable end wall within said annular wall, said annular wall and said end walls defining a hydraulic working chamber, a piston structure operable in said chamber and having a driving shaft extending therefrom through and journalled in said bearing extension, said detachable wall being hollow to provide a fluid replenishing chamber, and means independent of said piston structure for returning from said shaft bearing to said replenishing chamber any fluid escaping from said working chamber to said bearing.

10. In a hydraulic shock absorber, an annular wall and end walls defining a space for containing hydraulic fluid, a partition structure within said space, a piston structure within said space, said partition structure and piston structure dividing said space into working chambers, a shaft extending from said piston structure through and journalled in one of said end walls, means providing a fluid reservoir adjacent to the other end wall, means providing a path for return to said reservoir of fluid escaping from said working chambers to said shaft bearing, said path including a duct through said partition structure.

11. In a hydraulic shock absorber, an annular wall and end walls defining a space for hydraulic fluid, a partition structure within said space, a dowel pin extending through said partition structure and engaging said end wall structure for holding said end walls and partition structure in alignment, a piston structure within said space, said partition structure and said piston structure dividing said space into working chambers, a shaft extending from said piston structure through and journalled in one of said end walls, means providing a fluid reservoir adjacent to the other end wall, and means providing a path for return to said reservoir of fluid escaping from said working chamber to said shaft bearing, said path including a bore through said dowel pin.

12. In a hydraulic shock absorber, the combination of an annular wall structure, end wall structures defining with said annular wall structure a cylindrical space for hydraulic fluid, partition lugs extending into said space, a shaft extending through said space and end wall structures and journalled by said end wall structures, piston vanes extending from said shaft into said space and with said lugs dividing said space into high pressure and low pressure chambers, a passageway through said shaft connecting the high pressure chambers and a passageway through said shaft connecting the low pressure chambers, a valve interposed between said passageways for metering the flow of fluid between the high pressure and low pressure chambers, one of said end wall structures being hollow to provide a fluid reservoir, and means controlling the flow of fluid from said reservoir to said pressure chambers.

RALPH F. PEO.